(12) United States Patent
Chatterjee et al.

(10) Patent No.: US 7,058,639 B1
(45) Date of Patent: Jun. 6, 2006

(54) USE OF DYNAMIC MULTI-LEVEL HASH TABLE FOR MANAGING HIERARCHICALLY STRUCTURED INFORMATION

(75) Inventors: Surojit Chatterjee, Foster City, CA (US); Sameer Joshi, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 468 days.

(21) Appl. No.: 10/232,907

(22) Filed: Aug. 30, 2002

Related U.S. Application Data (60) Provisional application No. 60/372,186, filed on Apr. 12, 2002, provisional application No. 60/370,963, filed on Apr. 8, 2002.

(51) Int. Cl.
*G06F 17/30* (2006.01)

(52) U.S. Cl. .............................. 707/100; 707/1; 707/10; 711/216

(58) Field of Classification Search .............. 707/1–10, 707/100–104.1, 200–206; 711/113, 118–119, 711/216, 213, 218–219
See application file for complete search history.

(56) References Cited

U.S. PATENT DOCUMENTS

| | | | |
|---|---|---|---|
| 4,817,091 A | | 3/1989 | Katzman et al. |
| 5,991,776 A | * | 11/1999 | Bennett et al. ............. 707/205 |
| 6,016,499 A | | 1/2000 | Ferguson |
| 6,047,285 A | * | 4/2000 | Jacobs et al. ................... 707/4 |
| 6,067,584 A | | 5/2000 | Hayles et al. |
| 6,105,025 A | * | 8/2000 | Jacobs et al. ................... 707/8 |
| 6,292,795 B1 | * | 9/2001 | Peters et al. .................... 707/3 |
| 6,327,594 B1 | | 12/2001 | Van Huben et al. |
| 6,345,382 B1 | | 2/2002 | Hughes |
| 6,421,662 B1 | * | 7/2002 | Karten ........................... 707/3 |
| 2003/0191739 A1 | | 10/2003 | Chatterjee et al. |

OTHER PUBLICATIONS

European Patent Office, "International Search Report," application No. 03716862.2-1527, dated Jun. 8, 2005, 7 pages.
Current Claims, application No. 03716862.2-1527, 10 pages.
Oracle Corporation, "Oracle 8/ Administrator's Guide," Release 2 (8.1.6), Dec. 1999, Part No. A76956-01, Chapter 16, 14 pages.
International Preliminary Examining Authority, "Notification of Transmittal of the International Preliminary Examination Report," Jul. 13, 2004, 18 pages.

(Continued)

*Primary Examiner*—Shahid Alam
*Assistant Examiner*—Jean Bolte Fleurantin
(74) *Attorney, Agent, or Firm*—Hickman Palermo Truong & Becker LLP; John D. Henkhaus (57) ABSTRACT

An aspect of the invention provides a method for managing information associated with a hierarchical key. A plurality of hash tables are created for a plurality of levels of a hierarchy associated with a hierarchical key, wherein each hash table is associated with a corresponding level of the hierarchy. Entries are stored within each of the plurality of hash tables, wherein the entries are associated with key names that have as many levels as the level associated with the respective hash table. Furthermore, a reference to a descendant entry that is in a respective hash table may be stored within each entry.

34 Claims, 8 Drawing Sheets

```
┌─────────────────────────────────────────────────┐
│  CREATE A PLURALITY OF HASH TABLES FOR A        │ ─202
│  PLURALITY OF LEVELS OF A HIERARCHY, WITH EACH  │
│  TABLE BEING ASSOCIATED WITH A CORRESPONDING    │
│            LEVEL OF THE HIERARCHY               │
└─────────────────────────────────────────────────┘
                         │
                         ▼
┌─────────────────────────────────────────────────┐
│  STORE, WITHIN EACH OF THE PLURALITY OF HASH    │ ─204
│  TABLES, ENTRIES THAT ARE ASSOCIATED WITH KEY   │
│  NAMES THAT HAVE AS MANY LEVELS AS THE LEVEL    │
│   ASSOCIATED WITH THE RESPECTIVE HASH TABLE     │
└─────────────────────────────────────────────────┘
```

OTHER PUBLICATIONS

Current claims in PCT application, International Application No. PCT/US03/09407, 10 pages.

Jim Gray et al., "Transaction Processing: Concepts and Techniques," 1993, pp. 556-558.

Werner Vogels et al., "The Design and Architecture of the Microsoft Cluster Service, A Practical Approach to High-Availability and Scalability," May 1997, Cornell University Dept. of CS Technical Report, number assignment in preparation, 10 pages.

Werner Vogels et al., "Scalability of the Microsoft Cluster Server," undated, 9 pages.

Gregory F. Pfister, "Second Edition, In Search of Clusters, The Ongoing Battle in Lowly Parallel Computing," 1995, Chapter 4, pp. 71-84.

Murthy Devarakonda et al., "Recovery in the Calypso File System," ACM Transactions on Computer Systems, vol. 14, No. 3, Aug. 1996, pp. 287-310.

Marshall Kirk McKusick et al., "A Fast File System for UNIX*," Revised Feb. 18, 1984, pp. 1-14.

Mendel Rosenblum et al., "The Design and Implementation of a Log-Structured File System," Jul. 24, 1991, pp. 1-15.

Gregory R. Ganger et al., "Embedded Inodes and Explicit Grouping: Exploiting Disk Bandwidth for Small Files," First appeared in the Proceedings of the USENIX Technical Conference, Jan. 1997, pp. 1-17.

Keith Smith et al., "File Layout and File System Performance," TR-35-94, undated, pp. 1-23.

Tatu Ylönen, "Shadow Paging Is Feasible," undated, pp. 1-15.

Tatu Ylönen, "Write Optimizations and Clustering in Concurrent Shadow Paging," undated, pp. 1-16.

Tatu Ylönen, "Concurrent Shadow Paging: A New Direction for Database Research," undated, pp. 1-7.

Hewlett-Packard Company, "The Gold Standard: Cluster File System in hp TruCluster Server, Extending the advantages of single-system file systems to high availability clusters," Oct. 2002, pp. 1-16.

Tim Read et al., "Robust Clustering: A Comparison of Sun™ Cluster 3.0 versus Sun Cluster 2.2 Software," Sun BluePrints™OnLine-Sep. 2001, pp. 1-23.

Microsoft Corporation, "Microsoft® Windows2000 Advanced Server, Windows 2000 Clustering Technologies: Cluster Service Architecture," 2000, 27 pages.

Sun® Microsystems, Inc., "The Sun Enterprise Cluster Architecture, Technical White Paper," 1997, pp. 1-74.

Compaq Computer Corporation, UNIX Software Division, "Cluster File System in Compaq TruCluster Server, Extending the advantages of single-system file systems to high availability clusters," Sep. 2001, pp. 1-13.

* cited by examiner

USE OF DYNAMIC MULTI-LEVEL HASH TABLE FOR MANAGING HIERARCHICALLY STRUCTURED INFORMATION

CROSS REFERENCE TO RELATED APPLICATIONS

This application is related to and claims the benefit of priority from U.S. Provisional Patent Application No. 60/370,963 entitled "Personalized Content Within A Global Namespace," filed on Apr. 8, 2002, and U.S. Provisional Patent Application No. 60/372,186 entitled "Approach for Personalized Content Within a Global Namespace," filed on Apr. 12, 2002; and is related to U.S. patent application Ser. No. 10/304,449, filed on Nov. 25, 2002; U.S. patent application Ser. No. 10/253,088, filed on Sep. 23, 2002; and U.S. patent application Ser. No. 10/308,809, filed on Dec. 2, 2002; all of which are incorporated by reference in their entirety for all purposes, as if fully set forth herein.

FIELD OF THE INVENTION

The present invention relates generally to database management systems and, more specifically, to techniques for managing hierarchically structured information.

BACKGROUND OF THE INVENTION

Hierarchical Data Model

A data model provides the general structure of a database. A data model can be viewed as a collection of conceptual tools for describing data, data relationships, data semantics, and consistency constraints.

It is often useful to model data in a hierarchical structure. In a hierarchical model, data and relationships among data are represented by records and links, respectively. Hierarchically modeled data is logically structured as a "tree", which includes a conglomeration of parent-child relationships between data within the hierarchical structure. LDAP (Lightweight Directory Access Protocol), Microsoft® Windows® registry, and Oracle® Cluster Registry are examples of uses of hierarchically modeled or structured information.

Figure 1:
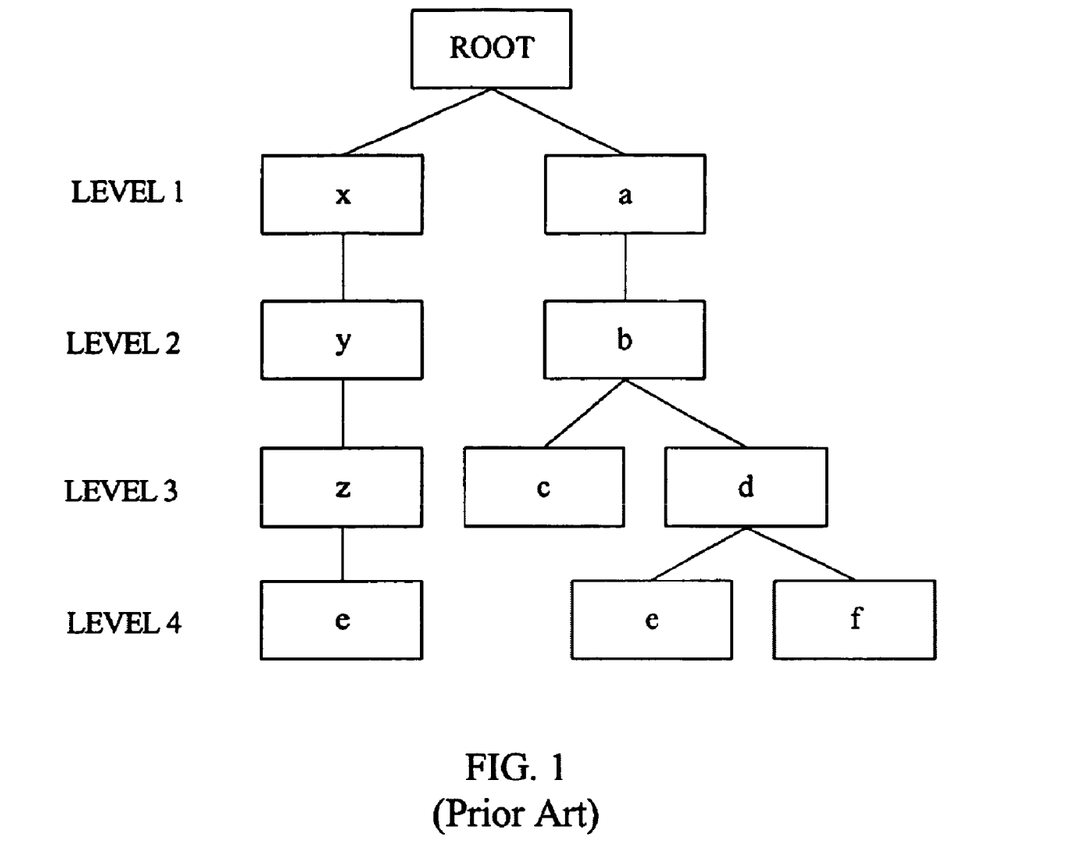
FIG. 1 is a diagram graphically illustrating a hierarchical structure.

FIG. 1 is a diagram graphically illustrating hierarchically structured, or related, data. Structuring data hierarchically provides some benefits over other data structures. It is easier to explore hierarchically structured data than other data structures, due to the inherent semantical benefits of the hierarchical structure. For example, one can intuitively traverse a hierarchy to locate a specific data item of interest.

Hierarchically organized data is generally represented by a key name-value (or name-value) pair. More specifically, each item of information is identified within the hierarchy by a key name consisting of key components. The term "key name" is generally used herein to refer to a specific value within the key domain associated with the hierarchy. For example, a key domain may be network IP addresses and an associated key name may be 255.255.000.000. For another example, a domain may be the collection of URLs associated with the public Internet, and an associated key of the domain may be a specific URL associated with a specific web page.

For example, a file's location in a hierarchical directory may be identified as: C:\My Documents\example.doc, wherein each backslash separates levels of the associated hierarchy. More generally, information may be identified by a key name represented as a character string, such as a.b.d.e, where key component e is a child (i.e., a descendant) of key component d, key component d is a child of key component b, and so on, to the hierarchy root. In some contexts, hierarchically organized information contains name-value pairs. A value is information associated with a name. For example, in the foregoing hierarchical directory path, "My Documents\example.doc" is a name of a name-value pair, which identifies the value of example.doc, which is the value of the name-value pair. That is, the content of the file example.doc is referred to as the value of the name-value pair.

FIG. 1 illustrates that a hierarchical structure has levels associated with the structure, and thus, the key name. That is, each key name has as many levels as the number of key components in the key name. For example, items x and a are one level from the root, so they are considered at Level 1; items z, c, and d are three levels from the root and are considered at Level 3.

Hash Table Storage

Hash tables are often used to store and to access information stored in a database. A hash function generates hash keys based on input values. The hash key generated for a given input is used to identify a location or index within a hash table for storing information associated with the given input. In other words, a hash function generates an index into a hash table given a hash key. For example, a hash key is generated using a function, h=f(input value), and an index i on a hash table is generated using a hash function, such as i=g(h), where g is the hash function. If a hash table is used for storing hierarchically organized information, the stored information would include the identifying key name. Because a hash function is used to dictate the location at which data is stored, the information within the hash table is typically in a random order, but is easily and quickly located through use of the associated hash function. Use of hash tables has certain advantages and disadvantages in relation to other storage forms.

For example, use of a monolithic hash table to store information facilitates relatively fast search and insert operations, but lacks speed when performing recursive delete operations (due to the random order of the records) and does not provide memory optimization (due to the repetition of identifying key name information). In one particular instance in which the information of interest is a name-value pair, often the name is quite large. Furthermore, and some portions of the name are often repeated, for example, "oracle.products.database.RAC" and "oracle.products.database.singleinstance". Thus repetition of the common portion of the name wastes resources.

For another example, in the case of a recursive delete operation of information b and its descendants, each entry of a conventional hash table would need to be checked to determine whether it is a descendant of b, to determine whether it should be deleted during the recursive delete operation. This process has computational complexity equal to the number of entries in the table. The number of entries in a hash table may be very large and thus, the information is more computationally complex to work with than is information organized in a simple tree structure.

Based on the foregoing, it is clearly desirable to provide a mechanism for optimally managing information, or values, associated with a hierarchical key name-value pair.

BRIEF SUMMARY OF EMBODIMENTS OF THE INVENTION

For managing hierarchically structured information, a multi-level hash table is created by creating a plurality of hash tables for a plurality of levels of a hierarchy associated with the hierarchically structured information. Each hash table is associated with a corresponding level of the hierarchy. Hash table entries are stored within each of the plurality of hash tables. The entries within a given hash table are associated with key names that have as many levels as the level associated with that given hash table. In one embodiment, for key names that have descendants, the associated entries store references to the hash table entries for those descendants.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and system are described for managing hierarchically structured information. In addition, and more specifically, methods and systems are described for locating and deleting hierarchically related information, or values, associated with a key name.

Name-value pairs are a ubiquitous concept describing, generally, a named piece of data. For example, a web page URL can be considered a key name in the domain of all URLs associated with the Internet, whereas the content of the web page can be considered the key value.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to one aspect, a multi-level hash table is created by creating a plurality of hash tables for a plurality of levels of a hierarchy associated with hierarchically structured data, wherein each hash table is associated with a corresponding level of the hierarchy. Hash table entries are stored within each of the plurality of hash tables. The entries within a given hash table are associated with key names that have as many levels as the level associated with that given hash table.

In one embodiment, for key names that have descendants, the associated entries store references to the hash table entries for those descendants. In one embodiment, a hash table array index is created for identifying the location of each of the plurality of hash tables that are stored together logically in an array. The plurality of hash tables and associated methods may be implemented, for non-limiting examples, in a cache and in a cluster repository.

Other embodiments include methods for populating the multi-level hash table; locating an entry and its value, in a hash table of the multi-level hash table; deleting and recursively deleting information from the multi-level hash table; and traversing from a parent entry to a child entry within the multi-level hash table.

Various implementations of the techniques described are embodied in methods, in computer-readable media, and in apparatus.

Managing Information Associated With a Hierarchical Key

Figure 2:
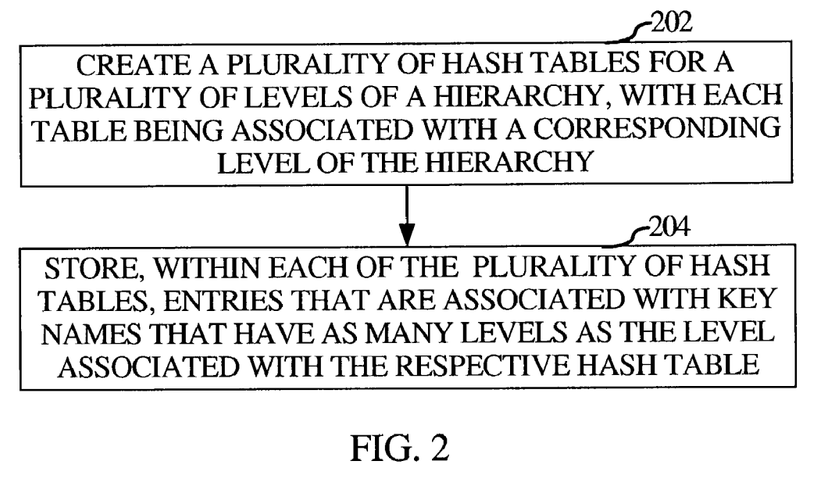
FIG. 2 is a flowchart illustrating a process for managing information associated with a hierarchical key, according to an embodiment of the invention.

FIG. 2 is a flowchart illustrating a process for managing information associated with a hierarchical key, according to an embodiment of the invention.

At block 202, a plurality of hash tables are created for a plurality of levels of a hierarchy of the hierarchical key. Each hash table is associated with a corresponding level of the hierarchy. Hence, referring to the hierarchy of FIG. 1 (which is used as an example hierarchy throughout this description), four hash tables are created according to this embodiment, one for each of the four levels. At block 204, entries are stored within each of the plurality of hash tables. The entries within each hash table are associated with key names that have as many levels as the level associated with the corresponding hash table. For example, entries for e and for f, which respectively correspond to the key names a.b.d.e and a.b.d.f, are stored within a same Level 4 hash table because both key names have four levels. Similarly, entries for c and for d, which respectively correspond to the key names a.b.c and a.b.d (both key names having three levels), are stored within a same Level 3 hash table.

In one embodiment, if a given hash table entry corresponds to a key name that has any descendants in the hierarchy, then the entry includes references to the hash table entries that correspond to those descendants. Such "descendant entries" reside in a hash table that is different than the hash table that contains the entry that refers to them. For example, the entry for a.b would reside in the level 2 hash table, because a.b is in the second level of the hierarchy. The direct descendants of a.b. are a.b.c and a.b.d. The entries for each of a.b.c and a.b.d will reside an the level 3 hash table because those key names reside in the third level of the hierarchy.

Figure 4:
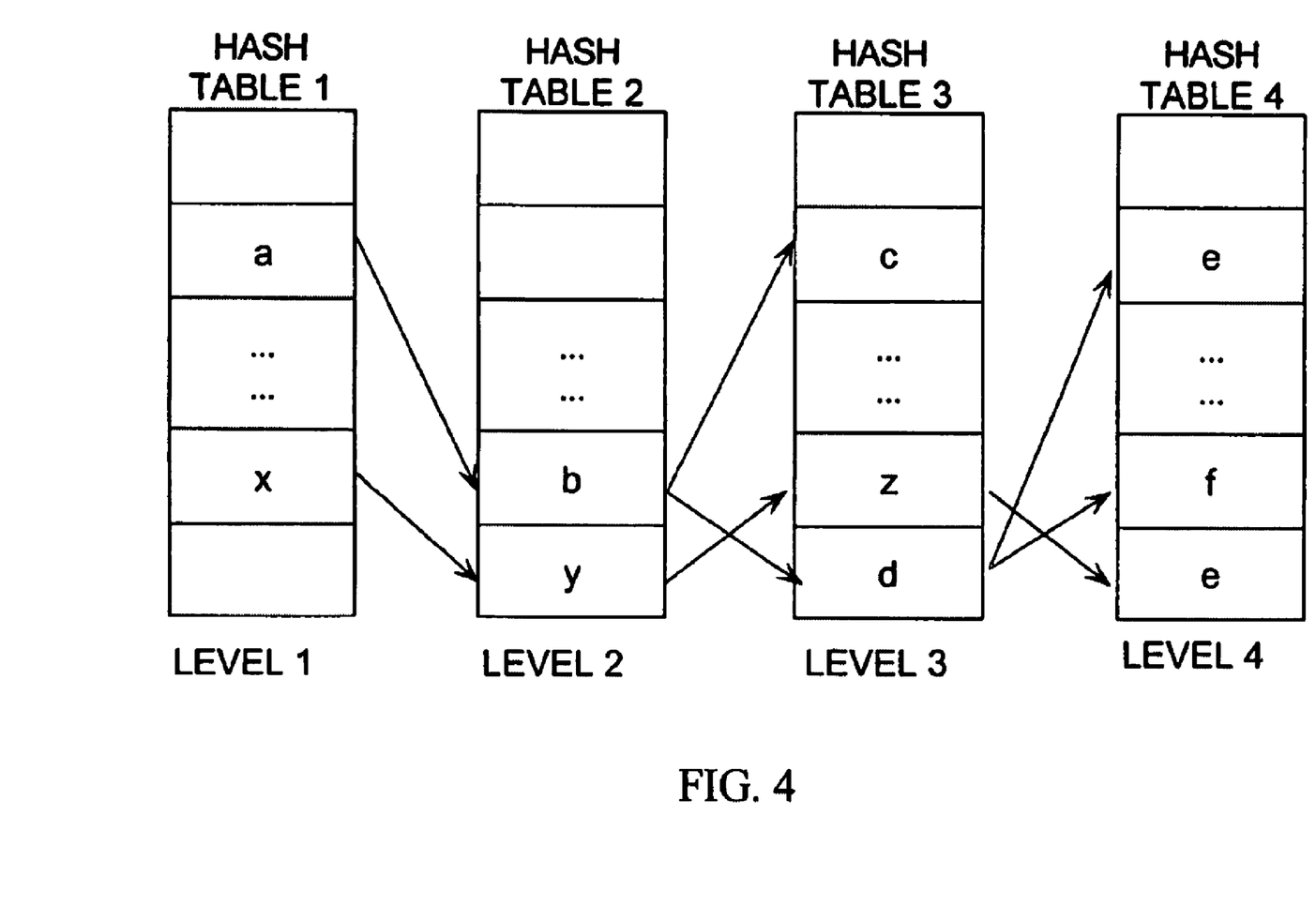
FIG. 4 is a diagram illustrating a multi-level hash table, according to an embodiment of the invention.

FIG. 4 is a diagram illustrating a multi-level hash table, according to an embodiment of the invention. As shown and described, each level of the hierarchy has a corresponding hash table, and entries within each hash table are associated with key names that have as many levels as the level associated with the respective hash table. Furthermore, each entry with a descendant has a reference (e.g., a pointer) to the descendant in the next level hash table. For example, key component a of key name a.b.d.e is in the Level 1 table and has a reference to key component b in the Level 2 table. Continuing, key component b of key name a.b.d.e includes a reference to key component d in the Level 3 table, and key component b of key name a.b.c includes a reference to key component c in the Level 3 table, and so on.

Each hash table may include a logical pseudo-column that comprises hash keys that identify the locations of the entries in memory. Thus, a hash table entry typically includes a hash key and some additional information, such as metadata. Each key component of a key name for a given item has an associated unique hash key, which is computed using a hash key function, of which the key component and ancestor key name are inputs. Hence, as depicted in FIG. 4, the key component e of key name a.b.d.e has a different entry in the Level 4 table than the key component e of key name x.y.z.e. Each entry is located through its respective hash key, computed from the hash key functions h(e, a.b.d) and h(e, x.y.z), respectively. Each of the various hash tables can utilize the same global hash key function, or alternatively, each hash table can utilize different hash key functions if desired.

With the foregoing embodiment depicted in FIG. 2, the benefits of both a hierarchical structure and a hash table are recognized. The hierarchical relationships among key components are maintained through the use of different hash tables corresponding to the different levels of the hierarchical key. Furthermore, in another foregoing embodiment, the hierarchy is also maintained through the references within each entry for a key component with descendants in the hierarchy. The entries are quickly accessible through use of the hash function and associated tables, and through the inherent benefits of hashing with respect to indexing/locating entries.

According to one embodiment, the hash tables are stored in a cache. Hence, faster operations are provided, for example, faster read operations. Furthermore, in one embodiment, a counter is maintained for each entry, whereby the counter tracks the number of times that the respective entry is accessed. Based on the counters, the entry that is least frequently accessed (i.e., used) is determined, and is deleted (sometimes referred to as "evicted") if memory space is needed for new entries. This feature contributes to optimized usage of computing resources. Algorithms other than a "least frequently used" (LFU) algorithm can be used to select entries for deletion as part of a replacement operation.

In one embodiment, a hash table array index is created for identifying the location of each of the hash tables that are logically stored as an array. That is, all of the hash tables are put into another table, or array, for easy access. Hence, access to a particular hash table, and ultimately to an entry, is made faster through use of the hash table array and its associated hash table array index. In one implementation, the hash table array is a one-dimensional array with pointers or other references (sometimes referred to as "hash table numbers") to each respective hash table.

In one embodiment, memory allocation for the hash tables is dynamic. That is, upon meeting a specified condition associated with a particular hash table, the space allocated for that particular hash table can be automatically increased, within the constraints of the overall available system memory. Furthermore, upon meeting a specified condition associated with a particular hash table, the space allocated for that particular hash table can be automatically decreased (deallocated). Examples, without limitation, of conditions that could trigger a dynamic reallocation of memory for a hash table are: current memory for a given table is X % used; a given table is the most frequently used table; and/or a given table is at a level above level Y (i.e., the table is at a level close to the root). These conditions may operate in combinations or alone to trigger dynamic reallocation of table memory.

Managing Information Associated With A
Hierarchical Key—Table Population

Figure 5:
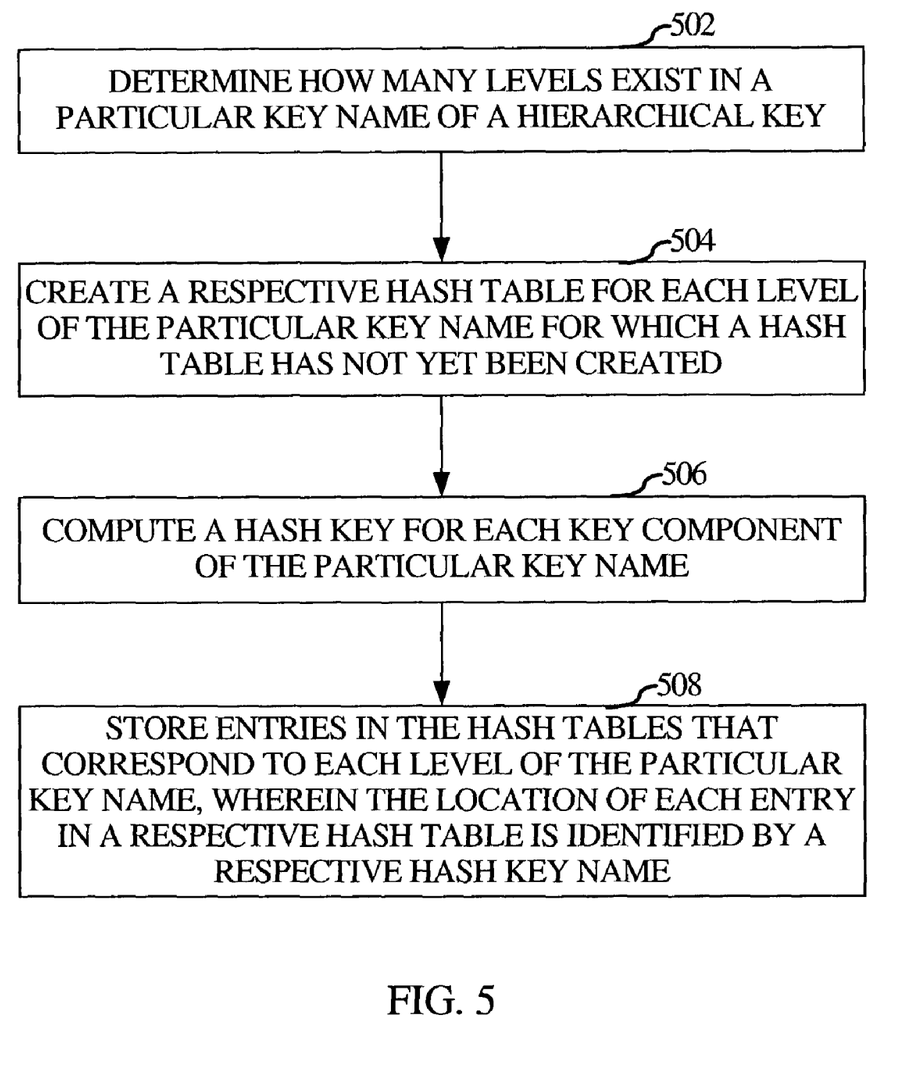
FIG. 5 is a flowchart illustrating a process for managing information associated with a hierarchical key, according to an embodiment of the invention.

FIG. 5 is a flowchart illustrating a process for managing information associated with a hierarchical key, according to an embodiment of the invention.

At block 502, the number of levels that exist in a particular key name of a hierarchical key is determined. Theoretically, a hierarchical key has infinite levels. Practically, a key name of the hierarchical key has a finite number of levels. For example, a key name of a.b.d.e is determined to have four levels, one level for each key component a, b, d, and e.

At block 504, a respective hash table is created for each level of the particular key name for which a hash table has not yet been created. For example, for key name a.b.d.e, and no prior hash tables exist, then four hash tables are created, one for each of the four levels of the key name, as depicted in FIG. 4.

At block 506, a hash key for each key component of the particular key name is computed. For example, h(e, a.b.d), h(d, a.b), h(b, a), and h(a, null) are computed for the respective key components, resulting in a different hash key for each key component. Thus, at block 508, an entry is stored in a hash table for each component for which an entry does not already exist. The hash table that holds the entry for a given component is determined by the number of levels of the component. The location within the hash table for the entry for a particular component is determined by the respective hash key for that component. That is, the hash keys are used as references to associated table entries. For example, a hash key may identify where information associated with a particular key component of the particular key name is located on a storage medium (e.g., a disk address), or elsewhere.

Even though a hash key determines where a corresponding entry should be located in a hash table, due to collisions, the entry for a given component may not always be located in the exact location indicated by a hash value produced by the component. In the case of collision, any one of numerous suitable collision-handling techniques may be used. The present invention is not limited to any particular technique for handling collisions.

Note that the key component e has more than one entry in the Level 4 table of FIG. 4. One entry represents the key component of key name a.b.d.e, and the other entry represents the key component of key name x.y.z.e. Since the key component (e.g., key component e) and its ancestor key name are input to the hash key function to compute associated hash keys, the hash key function will output a different hash key for each key component e associated with the different key names. Hence, the different table entries for key components e are stored at different locations in memory because they represent different components within the same hierarchy. The different key components e are distinguishable from each other due to their different hash keys, which identify the respective locations of the appropriate key component information.

The foregoing process illustrated in FIG. 5 creates and populates a multi-level hash table according to an embodiment of the invention.

Locating Information Associated With a Hierarchical Key

Figure 6:
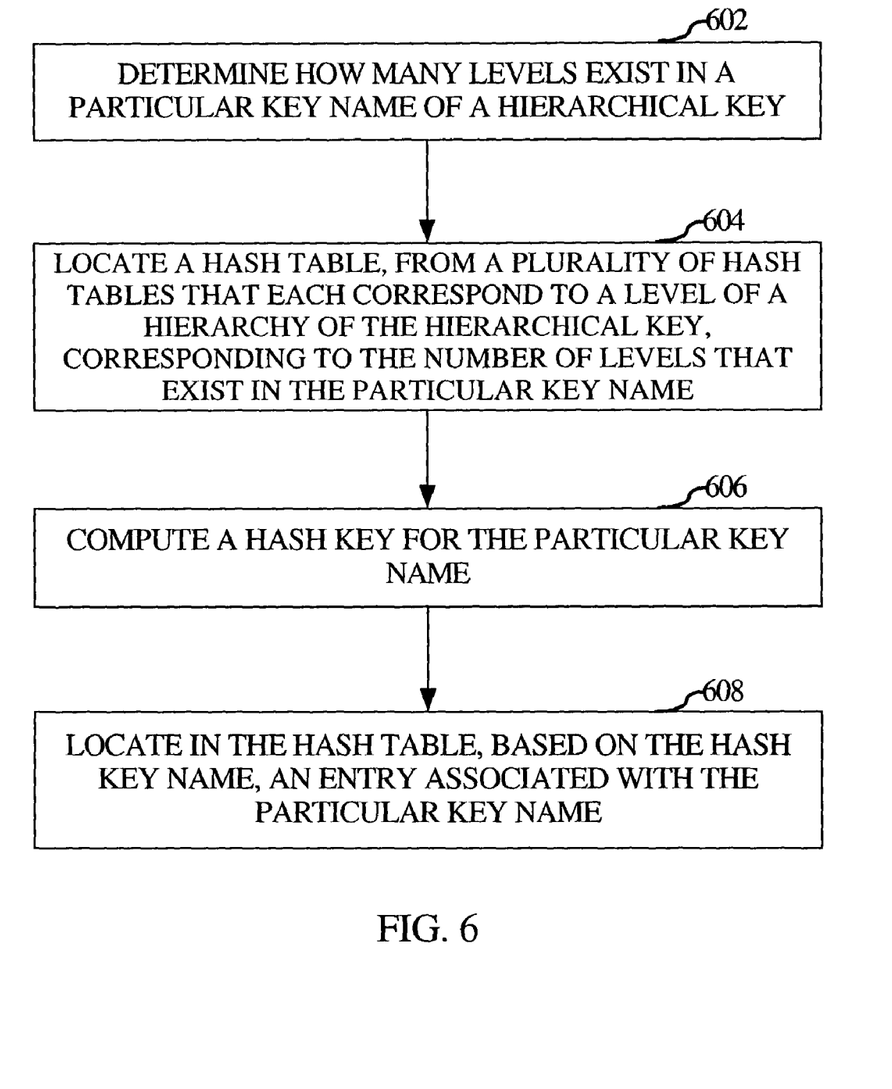
FIG. 6 is a flowchart illustrating a process for locating information associated with a hierarchical key, according to an embodiment of the invention.

FIG. 6 is a flowchart illustrating a process for locating information associated with a hierarchical key, according to an embodiment of the invention.

At block 602, the number of levels that exist in a particular key name of a hierarchical key is determined. For example, given key name a.b.d.e, it is determined that four levels exist for this key name.

At block 604, a hash table corresponding to the number of levels that exist in the particular key name is located, from a plurality of hash tables that each correspond to a level of a hierarchy of the hierarchical key. For example, for a given key name a.b.d.e, a hash table corresponding to the level of key component e (i.e., the fourth level) is located. In one embodiment, a hash table array index is used to locate the particular hash table in a hash table array associated with the hierarchical level of interest.

At block 606, a hash key for the particular key name is computed. For example, h(e, a.b.d) is computed, resulting in a hash key for that particular key name. At this stage of the process, both the appropriate hash table and a hash key have been determined for a given key name. Thus, at block 608, an entry associated with the particular key name is located in the hash table that was located at block 604, based on the hash key determined at block 606.

Given a particular key name, the foregoing process illustrated in FIG. 6 accesses an entry (i.e., information) logically located in a multi-level hash table according to an embodiment of the invention.

Deleting Information Associated With a Hierarchical Key

Figure 7:
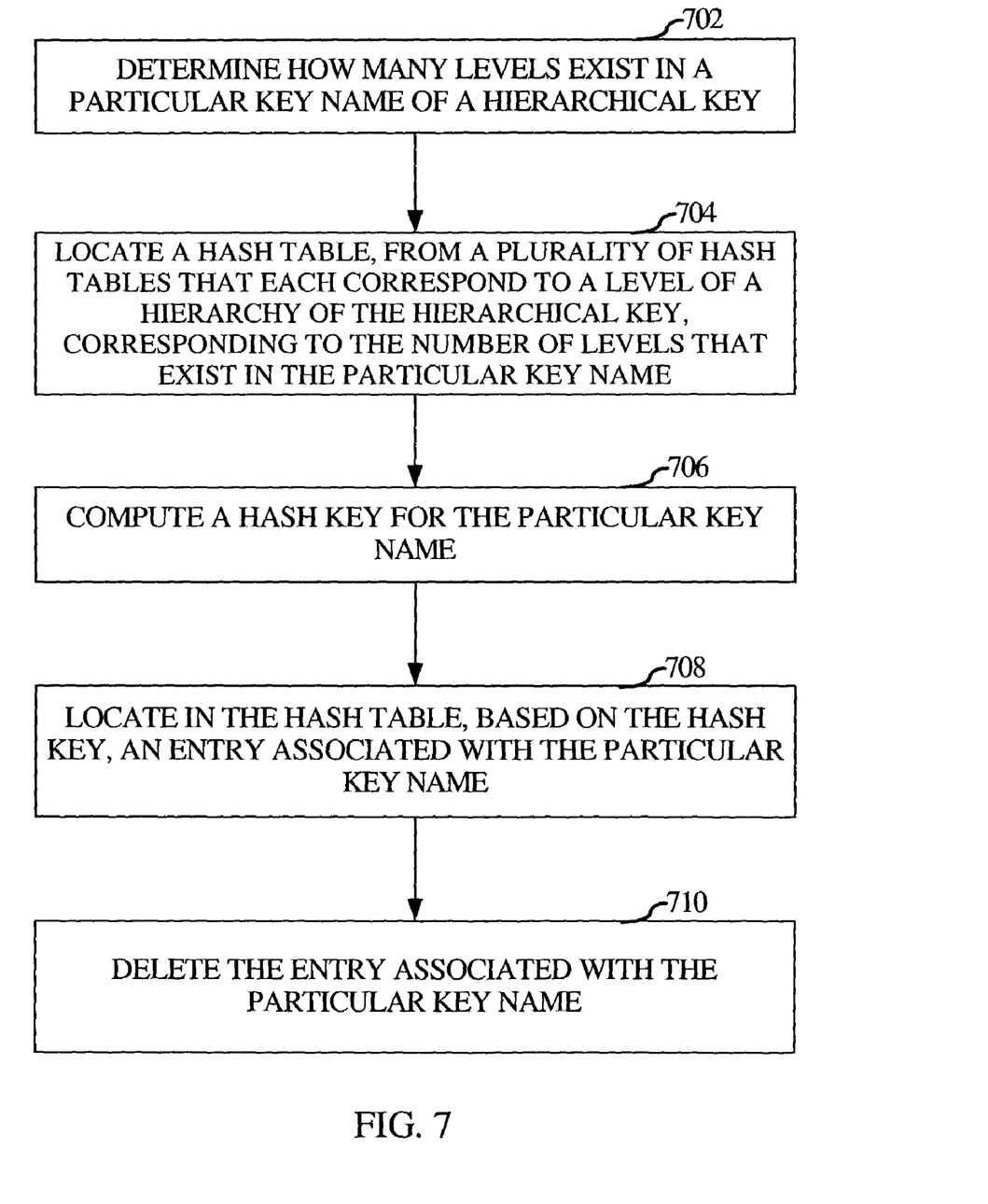
FIG. 7 is a flowchart illustrating a process for deleting information associated with a hierarchical key, according to an embodiment of the invention.

FIG. 7 is a flowchart illustrating a process for deleting information associated with a hierarchical key, according to an embodiment of the invention. The process described is similar to the process described in reference to FIG. 6, in which information is accessed from a multi-level hash table. In the process of FIG. 7, an additional step of deleting a located entry is included.

At block 702, the number of levels that exist in a particular key name of a hierarchical key is determined. At block 704, a hash table corresponding to the number of levels that exist in the particular key name is located, from a plurality of hash tables that each correspond to a level of a hierarchy of the hierarchical key. In one embodiment, a hash table array index is used to locate the particular hash table, stored in an array with the other hash tables, associated with the hierarchical level of interest. At block 706, a hash key for the particular key name is computed; and at block 708 an entry associated with the particular key name is located in the hash table that was located at block 704, based on the hash key determined at block 706.

Finally, at block 710, the entry associated with the particular key name (which was located at block 708) is deleted. Given a particular key name, the foregoing process illustrated in FIG. 7 accesses and deletes an entry (i.e., information) logically located in a multi-level hash table according to an embodiment of the invention.

Recursively Deleting Information Associated With a Hierarchical Key

Figure 8:
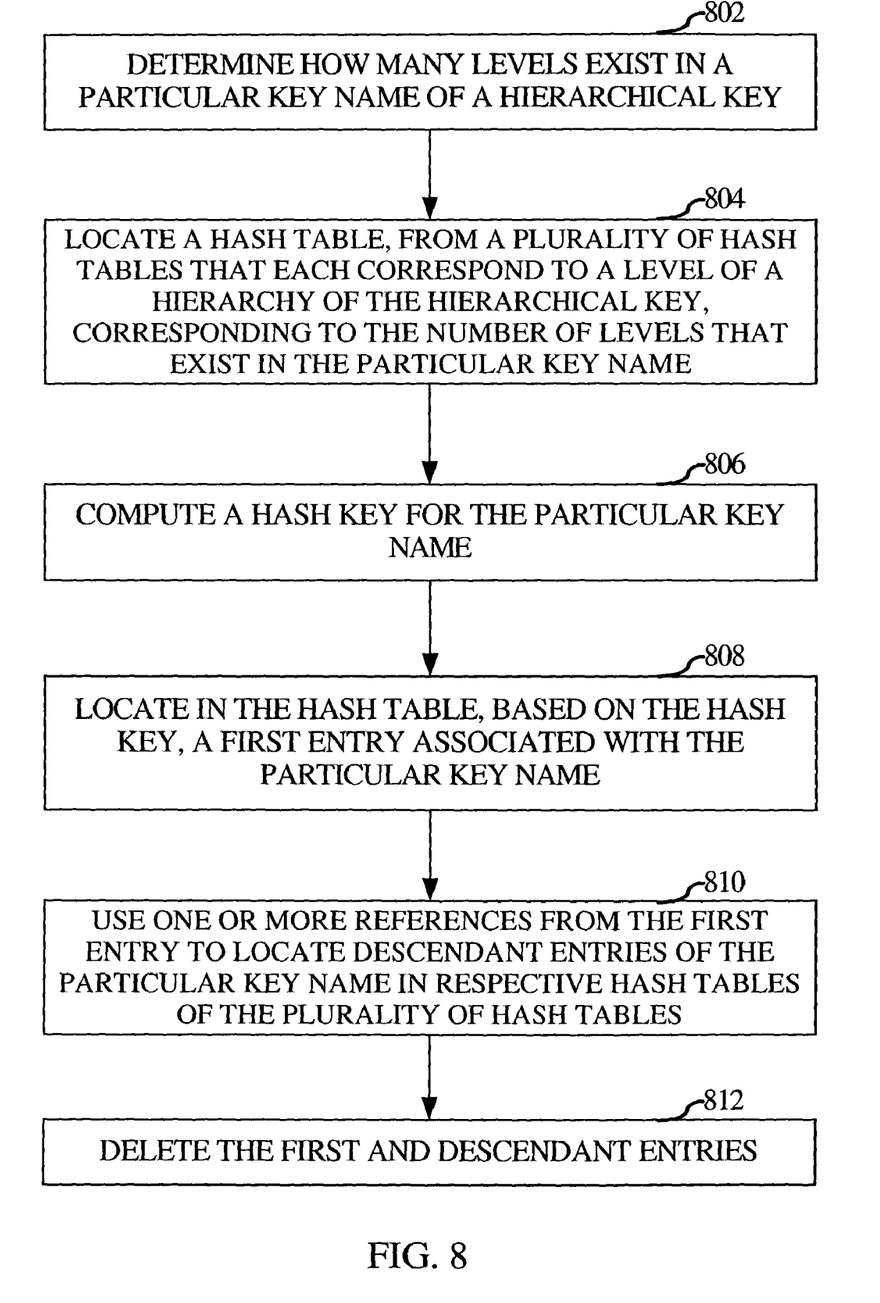
FIG. 8 is a flowchart illustrating a process for recursively deleting information associated with a hierarchical key, according to an embodiment of the invention.

As previously described, a recursive delete operation deletes a given entity in a hierarchy and all of its descendants in a branch of the hierarchy. FIG. 8 is a flowchart illustrating a process for recursively deleting information associated with a hierarchical key, according to an embodiment of the invention.

Blocks 802–808 are the same as or similar to blocks 702–708 of FIG. 7, and are briefly described again for completeness. At block 802, the number of levels that exist in a particular key name of a hierarchical key is determined. At block 804, a hash table corresponding to the number of levels that exist in the particular key name is located, from a plurality of hash tables that each correspond to a level of a hierarchy of the hierarchical key. In one embodiment, a hash table array index is used to locate the particular hash table, stored in a array with the other hash tables, associated with the hierarchical level of interest. At block 806, a hash key for the particular key name is computed; and at block 808, a first entry associated with the particular key name is located in the hash table that was located at block 804, based on the hash key determined at block 806.

At block 810, one or more references from the first entry are used to locate, in respective hash tables of the plurality of hash tables, one or more respective descendant entries of the particular key name. In this context, the term descendant is used to describe entities that are related to a given entity, and which are further from the root of the hierarchy than is the given entity. A descendant is a child in a parent-child relationship with the given entity, or with another descendant of the given entity. Referring to the hierarchy depicted in FIG. 1 for an example, y, z, and e (in the x branch) are all descendants of x; and b, c, d, e (in the a branch), and f are all descendants of a. Furthermore, e (in the a branch) and f are descendants of d, b, and a, but are not descendants of c. Returning to block 810 and referring to FIG. 4, for example, a reference from a in the Level 1 table is used to locate b in the Level 2 table, which includes references to c and d in the Level 3 table, and so on. Hence, references within table entries with descendants are used to trace the pertinent portion of the hierarchy.

Once the first and descendant entries have been located as described in reference to blocks 808 and 810, they are deleted at block 812, thereby completing the recursive deletion process.

Locating Information Associated With Key Names In a Hierarchy

Figure 3:
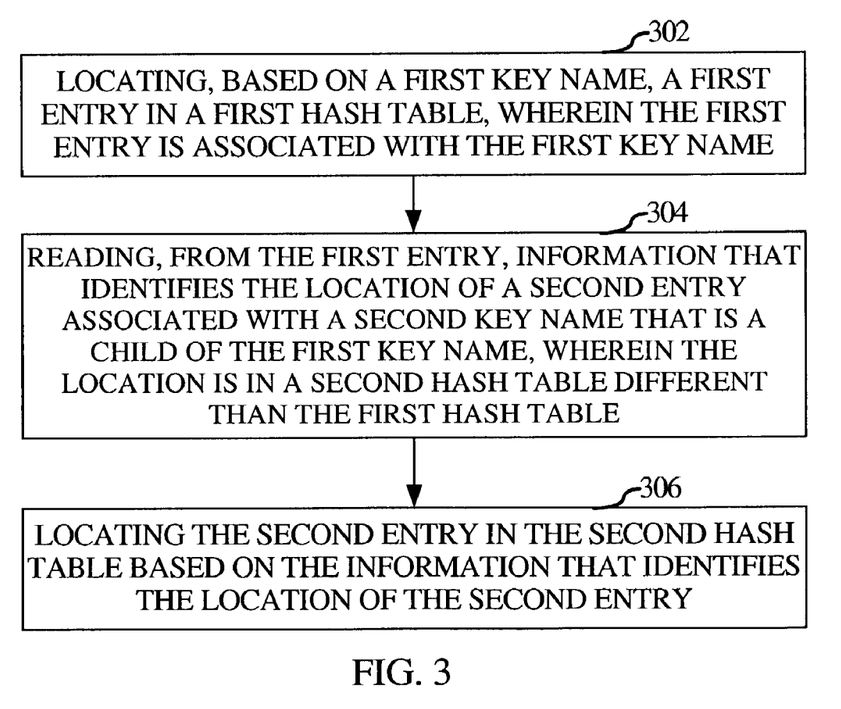
FIG. 3 is a flowchart illustrating a process for locating information associated with a first key name that is a child of a second key name in a hierarchy, according to an embodiment of the invention.

FIG. 3 is a flowchart illustrating a process for locating information associated with a second key name that is a child of a first key name in a hierarchy, according to an embodiment of the invention.

At block 302, a first entry in a first hash table is located, based on the first key name, wherein the first entry is associated with the first key name. For example, the first key name is hashed to determine the location of its associated first entry. Referring to FIG. 4 for an example, the hash function h(b, a) is executed for key name a.b, to determine the location of the entry for key component b.

At block 304, information that identifies a location of a second entry associated with the second key name, is read from the first entry, wherein the second entry is located in a table different than the location of the first entry. At block 306, the second entry is located in the second hash table based on the information that identifies the location of the second entry, which was obtained at block 304. For example, reference information within the first entry (i.e., a parent entry), which is located within the Level 2 table, is read and used to locate a second entry (i.e., a child entry), which is located within the Level 3 table. Referring to FIG. 4 for an example, the pointer from b is used to locate the entry for c in the Level 3 table.

The process of accessing hierarchically related information is somewhat intuitive to most people. Therefore, maintaining a pseudo-hierarchical structure within the multi-level hash table, (i.e., maintaining the plurality of hash tables each associated with a level of a hierarchy) is advantageous. Thus, the process depicted in FIG. 3 provides, for example, a user unfamiliar with the information of interest and its associated structure to traverse through the multi-level hash table to locate the information.

Operating Implementation Examples

A general example of an implementation of the techniques described herein includes implementation in a cache for cluster registry information. A system that maintains the configuration information for a collection of interconnected computers used and managed as a single resource (a "cluster") is an example of one type of system that may need to manage information associated with a hierarchical key. However, the techniques described herein are not limited to any particular type of system, and the scope of the invention is not limited to the implementation described or to the details described with respect to the implementation.

Since the process of cluster nodes communicating with a master node, which in turn communicates with a cluster repository, is a computationally expensive process, it is more efficient to maintain a cache of information at each node of the cluster. Hence, I/O operations with the cluster repository are kept to a minimum. The techniques described herein collectively decrease the access time to information in the repository in comparison to the use of monolithic hash tables and simple hierarchical structures, and therefore, provide an optimized technique for managing information associated with a hierarchical key.

Furthermore, since the techniques described herein are functional with multiple, or generic, repository mechanisms, the system cannot rely on the caching of disk blocks directly to local memory as is typical in caching environments. Consequently, the information is cached at a semantic level, that is, the logical structure of the hierarchically organized information is maintained, with no assumptions as to the physical structure of the cluster repository. For example, without limitation, these techniques allow for scaling a cluster to a large number of nodes, and allow optimizations in an associated cache coherency protocol.

Another general example of an implementation of the techniques described herein includes implementation in a web hosting scenario, thereby providing faster web page searching and retrieval from the web page storage mechanism or from cache at a web server. In this context, a URL is likened to the name of a name-value pair, whereas the page content is likened to the value of the name-value pair. Furthermore, implementation of these techniques can contribute to intelligent web search engines that utilize hierarchical taxonomies for classifying data such as web page content.

Note that the foregoing are but two examples of operating implementations of the techniques described herein; however, the invention is not limited to these implementations.

In general, the techniques described herein provide the ability to directly access hierarchically related information associated with a key domain without traversing the associated hierarchical tree of the domain (e.g., when a user has some knowledge of the information and its relationship to other information in the domain), as well as the ability to traverse the hierarchy of the domain (e.g., when a user has no knowledge of the information and its relationship to other information in the domain) to access the information (e.g., or for recursive delete operations).

Hardware Overview

Figure 9:
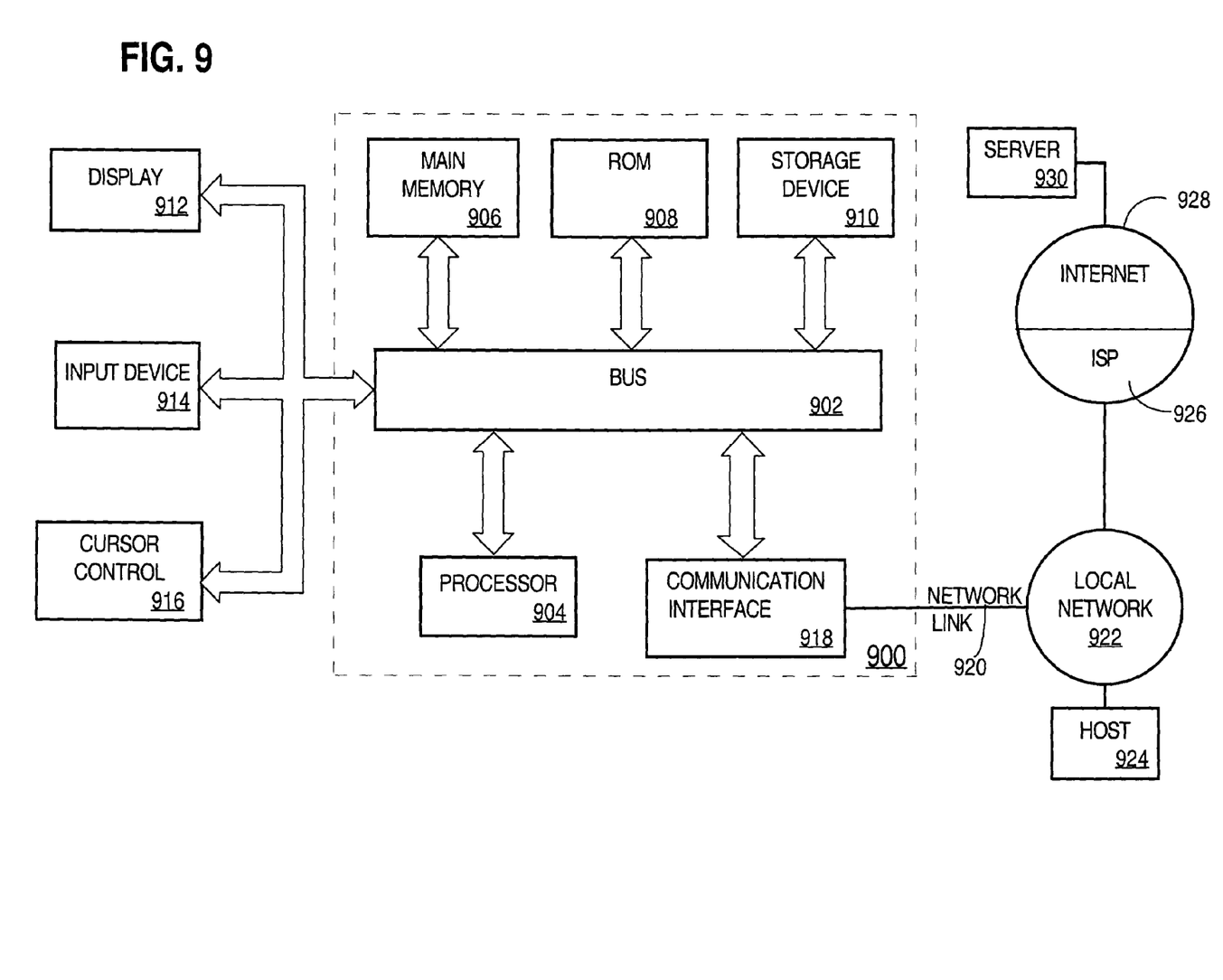
FIG. 9 is a block diagram that illustrates a computer system upon which an embodiment of the invention may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk, optical disk, or magneto-optical disk, is provided and coupled to bus 902 for storing information and instructions.

Computer system 900 may be coupled via bus 902 to a display 912, such as a cathode ray tube (CRT) or a liquid crystal display (LCD), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical, magnetic, or magneto-optical disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, an example implementation was presented in which the techniques described herein are implemented in a cache of a cluster system, possibly for cluster registry information. However, the techniques described herein are not limited to use for registry information or within a cache or a cluster system, but may be used in other implementations. For example, the techniques can be implemented in an Internet web hosting environment, through which more efficient caching of hierarchically related web pages can be achieved, as well as faster searches with respect to hierarchically related web pages. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for managing hierarchically structured information, the method comprising:
    creating a plurality of hash tables based on a composite key, wherein key values associated with the composite key are hierarchically related based on multiple levels;
    wherein each hash table corresponds to a particular level of the multiple levels; and
    storing, within each of the plurality of hash tables, entries that are associated with key values that have as many levels as the particular level that corresponds to the respective hash table.

2. The method of claim 1 comprising:
    storing within each entry a reference to a descendant entry, if any, that is in a respective hash table of the plurality of hash tables.

3. The method of claim 1 comprising:
    storing the plurality of hash tables in a cache.

4. The method of claim 3 comprising:
    maintaining a counter, for each entry, of a number of times that the respective entry is accessed;
    determining which entry is least frequently accessed based on the counters for the entries;
    deleting the entry that is least frequently accessed.

5. The method of claim 1 comprising:
creating a hash table index for identifying the location of each of the plurality of hash tables.

6. The method of claim 1, comprising:
creating a hash table array for storing the plurality of hash tables;
creating a hash table array index for the hash table array, and
using the hash table array index to identify the location of a hash table of the plurality of hash tables in the hash table array.

7. The method of claim 1 comprising:
dynamically allocating memory for a hash table of the plurality of hash tables upon meeting a specified condition associated with the hash table.

8. The method of claim 1 comprising:
dynamically deallocating memory for a hash table of the plurality of hash tables upon meeting a specified condition associated with the hash table.

9. The method of claim 1, wherein the key values are names associated with respective name-value pairs and the managed information are values associated with the respective name-value pairs, and wherein the steps of creating and storing are based on the name-value pairs.

10. The method of claim 9, wherein the value of at least one of the name-value pairs is null, and wherein the steps of creating and storing are based on the name-value pairs.

11. The method of claim 9, wherein the names of the name-value pairs are Universal Resource locators and the values of the name-value pairs are content associated with a respective Universal Resource Locator.

12. The method of claim 1 comprising:
storing the plurality of hash tables in a cluster repository.

13. A method for managing hierarchically structured information, the method comprising:
determining how many levels exist in a particular key name;
creating a respective hash table for each level of the particular key name for which a hash table has not yet been created;
computing a hash key for each key component of the particular key name; and
storing entries in the hash tables that correspond to key components that correspond to each level of the particular key name, wherein the location of each entry in a respective hash table is identified by a respective hash key.

14. A method for locating hierarchically structured information, the method comprising:
determining how many levels exist in a particular key name of a key domain;
locating a particular hash table from a plurality of hash tables, wherein each of the plurality of hash tables corresponds to a particular level of a hierarchy of the key domain, wherein the Particular hash table corresponds to the number of levels that exist in the particular key name;
computing a hash key for the particular key name; and
locating in the particular hash table, based on the hash key, an entry associated with the particular key name.

15. A method for deleting hierarchically structured information, the method comprising:
determining how many levels exist in a particular key name of a key domain;
locating a particular hash table from a plurality of hash tables, wherein each of the plurality of hash tables corresponds to a particular level of a hierarchy of the key domain, wherein the particular hash table corresponds to the number of levels that exist in the particular key name;
computing a hash key for the particular key name;
locating in the particular hash table, based on the hash key, an entry associated with the particular key name; and
deleting the entry associated with the particular key name.

16. A method for recursively deleting hierarchically structured information, the method comprising:
determining how many levels exist in a particular key name of a key domain;
locating a first hash table from a plurality of hash tables, wherein each of the plurality of hash tables corresponds to a particular level of a hierarchy of the key domain, wherein the particular hash table corresponds to the number of levels that exist in the particular key name;
computing a hash key for the particular key name;
locating in the first hash table, based on the hash key, a first entry associated with the particular key name;
using one or more references from the first entry to locate descendant entries of the particular key name in respective hash tables of the plurality of hash tables; and
deleting the first entry and the descendant entries.

17. A method for locating information associated with a second key name that is a child of a first key name in a hierarchy, the method comprising:
locating, based on the first key name, a first entry in a first hash table, wherein the first entry is associated with the first key name;
reading, from the first entry, information that identifies a location of a second entry associated with the second key name, wherein the location is in a second hash table different from the first hash table; and
locating the second entry in the second hash table based on the information that identifies the location of the second entry.

18. A computer-readable medium carrying one or more sequences of instructions for managing hierarchically structured information, wherein execution of the one or more sequences of instructions by one or more processors causes the one or more processors to perform the steps of:
creating a plurality of hash tables based on a composite key, wherein key values associated with the composite key are hierarchically related based on multiple levels;
wherein each hash table corresponds to a particular level of the multiple levels; and
storing, within each of the plurality of hash tables, entries that are associated with key values that have as many levels as the particular level that corresponds to the respective hash table.

19. The computer-readable medium of claim 18 wherein execution of the one or more sequences of instructions by one or more processors causes the one or more processors to perform the step of:
storing within each entry a reference to a descendant entry, if any, that is in a respective hash table of the plurality of hash tables.

20. The computer-readable medium of claim 18 wherein execution of the one or more sequences of instructions by one or more processors causes the one or more processors to perform the step of:
storing the plurality of hash tables in a cache.

21. The computer-readable medium of claim 20 wherein execution of the one or more sequences of instructions by one or more processors causes the one or more processors to perform the step of:

maintaining a counter, for each entry, of a number of times that the respective entry is accessed;

determining which entry is least frequently accessed based on the counters for the entries;

deleting the entry that is least frequently accessed.

22. The computer-readable medium of claim 18 wherein execution of the one or more sequences of instructions by one or more processors causes the one or more processors to perform the step of:

creating a hash table index for identifying the location of each of the plurality of hash tables.

23. The computer-readable medium of claim 18 wherein execution of the one or more sequences of instructions by one or more processors causes the one or more processors to perform the step of:

creating a hash table array for storing the plurality of hash tables;

creating a hash table array index for the hash table array, and using the hash table array index to identify the location of a hash table of the plurality of hash tables in the hash table array.

24. The computer-readable medium of claim 18 wherein execution of the one or more sequences of instructions by one or more processors causes the one or more processors to perform the step of:

dynamically allocating more memory for a hash table of the plurality of hash tables upon meeting a specified condition associated with the hash table.

25. The computer-readable medium of claim 18, wherein the key values are names associated with respective name-value pairs and the managed information are values associated with the respective name-value pairs, and wherein execution of the one or more sequences of instructions by one or more processors causes the one or more processors to perform the steps of creating and storing based on the name-value pairs.

26. The computer-readable medium of claim 25, wherein at least one value of the name-value pairs is null, and wherein execution of the one or more sequences of instructions by one or more processors causes the one or more processors to perform the steps of creating and storing based on the name-value pairs.

27. The computer-readable medium of claim 25, wherein the names of the name-value pairs are Universal Resource Locators and the values of the name-value pairs are content associated with a respective Universal Resource Locator, and wherein execution of the one or more sequences of instructions by one or more processors causes the one or more processors to perform the steps of creating and storing based on the name-value pairs.

28. The computer-readable medium of claim 18 wherein execution of the one or more sequences of instructions by one or more processors causes the one or more processors to perform the step of:

storing the plurality of hash tables in a cluster repository.

29. A computer-readable medium carrying one or more sequences of instructions for managing hierarchically structured information, wherein execution of the one or more sequences of instructions by one or more processors causes the one or more processors to perform the steps of:

determining how many levels exist in a particular key name;

creating a respective hash table for each level of the particular key name for which a hash table has not yet been created;

computing a hash key for each key component of the particular key name; and storing entries in the hash tables that correspond to each level of the particular key name, wherein the location of each entry in a respective hash table is identified by a respective hash key.

30. A computer-readable medium carrying one or more sequences of instructions for locating hierarchically structured information, wherein execution of the one or more sequences of instructions by one or more processors causes the one or more processors to perform the steps of:

determining how many levels exist in a particular key name of a key domain;

locating a particular hash table from a plurality of hash tables, wherein each of the plurality of hash tables corresponds to a particular level of a hierarchy of the key domain, wherein the particular hash table corresponds to the number of levels that exist in the particular key name;

computing a hash key for the particular key name; and locating in the particular hash table, based on the hash key, an entry associated with the particular key name.

31. A computer-readable medium carrying one or more sequences of instructions for deleting hierarchically structured information, wherein execution of the one or more sequences of instructions by one or more processors causes the one or more processors to perform the steps of:

determining how many levels exist in a particular key name of a key domain;

locating a particular hash table from a plurality of hash tables, wherein each of the plurality of hash tables corresponds to a particular level of a hierarchy of the key domain, wherein the particular hash table corresponds to the number of levels that exist in the particular key name;

computing a hash key for the particular key name;

locating in the particular hash table, based on the hash key, an entry associated with the particular key name; and deleting the entry associated with the particular key name.

32. A computer-readable medium carrying one or more sequences of instructions for recursively deleting hierarchically structured information, wherein execution of the one or more sequences of instructions by one or more processors causes the one or more processors to perform the steps of:

determining how many levels exist in a particular key name of a key domain;

locating a first hash table from a plurality of hash tables, wherein each of the plurality of hash tables corresponds to a particular level of a hierarchy of the key domain, wherein the particular hash table corresponds to the number of levels that exist in the particular key name;

computing a hash key for the particular key name;

locating in the first hash table, based on the hash key, a first entry associated with the particular key name;

using one or more references from the first entry to locate descendant entries of the particular key name in respective hash tables of the plurality of hash tables; and deleting the first entry and the descendant entries.

33. A computer-readable medium carrying one or more sequences of instructions for locating information associated with a second key name that is a child of a first key name in a hierarchy, wherein execution of the one or more sequences of instructions by one or more processors causes the one or more processors to perform the steps of:

locating, based on the first key name, a first entry in a first hash table, wherein the first entry is associated with the first key name;

reading, from the first entry, information that identifies a location of a second entry associated with the second key name, wherein the location is in a second hash table different from the first hash table; and     locating the second entry in the second hash table based on the information that identifies the location of the second entry.

34. The method of claim 1, wherein each hash table corresponds to only one particular level of the multiple levels and no two hash tables correspond to the same particular level of the multiple levels.

* * * * *